(12) United States Patent
Pal et al.

(10) Patent No.: US 8,997,116 B2
(45) Date of Patent: Mar. 31, 2015

(54) EVENT LOGGING APPLICATION PROGRAMMING INTERFACE (API)

(75) Inventors: Dmitri V. Pal, Framingham, MA (US); Stephen J. Gallagher, Methuen, MA (US); John R. Dennis, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 781 days.

(21) Appl. No.: 12/616,938

(22) Filed: Nov. 12, 2009

(65) Prior Publication Data

US 2011/0113436 A1   May 12, 2011

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 11/20* | (2006.01) |
| *G06F 15/173* | (2006.01) |
| *G06F 11/00* | (2006.01) |

(52) U.S. Cl.
CPC .................................. *G06F 11/2094* (2013.01)
USPC ............. 719/318; 709/238; 714/45; 717/127; 719/328

(58) Field of Classification Search
None
See application file for complete search history.

(56) References Cited

U.S. PATENT DOCUMENTS

| | | | |
|---|---|---|---|
| 6,529,909 B1 * | 3/2003 | Bowman-Amuah | 1/1 |
| 6,769,079 B1 * | 7/2004 | Currey et al. | 714/45 |
| 6,854,035 B2 * | 2/2005 | Dunham et al. | 711/117 |
| 7,234,166 B2 * | 6/2007 | Nurmela | 726/23 |
| 7,266,733 B2 * | 9/2007 | Bazinet et al. | 714/45 |
| 7,685,385 B1 * | 3/2010 | Choudhary et al. | 711/162 |
| 8,055,933 B2 * | 11/2011 | Jaehde et al. | 714/4.1 |
| 2008/0228832 A1 * | 9/2008 | Wetmore et al. | 707/201 |

* cited by examiner

*Primary Examiner* — Emerson Puente
*Assistant Examiner* — Jonathan R Labud
(74) *Attorney, Agent, or Firm* — Lowenstein Sandler LLP

(57) ABSTRACT

An event logging interface on a computer system is used to record an event when an application hosted by the computer system encounters the event. The event logging interface receives data pertaining to an event from the application. Using the event logging interface, the computer system determines a logical target of the event, and determines one or more physical destinations referenced by the logical target. The data is then dispatched to one of the physical destinations.

20 Claims, 4 Drawing Sheets

EVENT LOGGING APPLICATION PROGRAMMING INTERFACE (API)

TECHNICAL FIELD

Embodiments of the present invention relate to event logging in a computer system, and more specifically, to an application programming interface (API) that facilitates the generation of event logging information.

BACKGROUND

Computer applications generate and submit logging information to record events (e.g., errors or warnings). Conventionally, applications write logging information to files, databases or the syslog. The syslog is a standard for sending log messages in an Internet Protocol (IP) network but is difficult to process due to lack of structure. Files often do not have a well-defined structure, too. Databases generally provide a fixed structure for logging information such as audit logs. However, data in the audit logs often varies significantly from one situation to another. Databases usually do not have a clear definition for each data field where the definition can apply to all possible situations. Therefore, a database may end up in a situation where half of the fields are empty and most of the data has to be jammed into a few fields.

Generally, conventional event logging techniques are unable to reliably extract information from free form strings. One of the problems in the existing logging interfaces is that they permit application to send event messages in free form. This lack of structure in the messages makes analysis of the log data stream extremely difficult to reliably interpret. With the various formats that are conventionally used for logging information, it is also difficult to collect the logging information, merge and forward it to a centralized remote location for compliance and forensic inspections.

Conventional event logging techniques are also unable to dispatch data to multiple destinations. An application developer can specify one destination for the data related to an event. However, in some scenarios, an application developer may wish to send the same event data to different destinations that serve different purposes (e.g., logging, debugging and audit). To send event data to different destinations for logging, debugging and audit trails, an application developer usually needs to deal with multiple different interfaces and multiple different ways of generating information from the application.

Additionally, conventional applications usually select a logging interface such as the syslog or files for convenience during the developmental time. As the development of the application matures, an application developer may want to change the logging destination to a more advanced alternative. An application developer may also want to write the logging information into a file that is human readable. Moreover, when a logging destination fails, an application developer may want to write the logging information into a backup destination. However, modifying an application to change its logging destination and data formatting can be time consuming and error prone.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
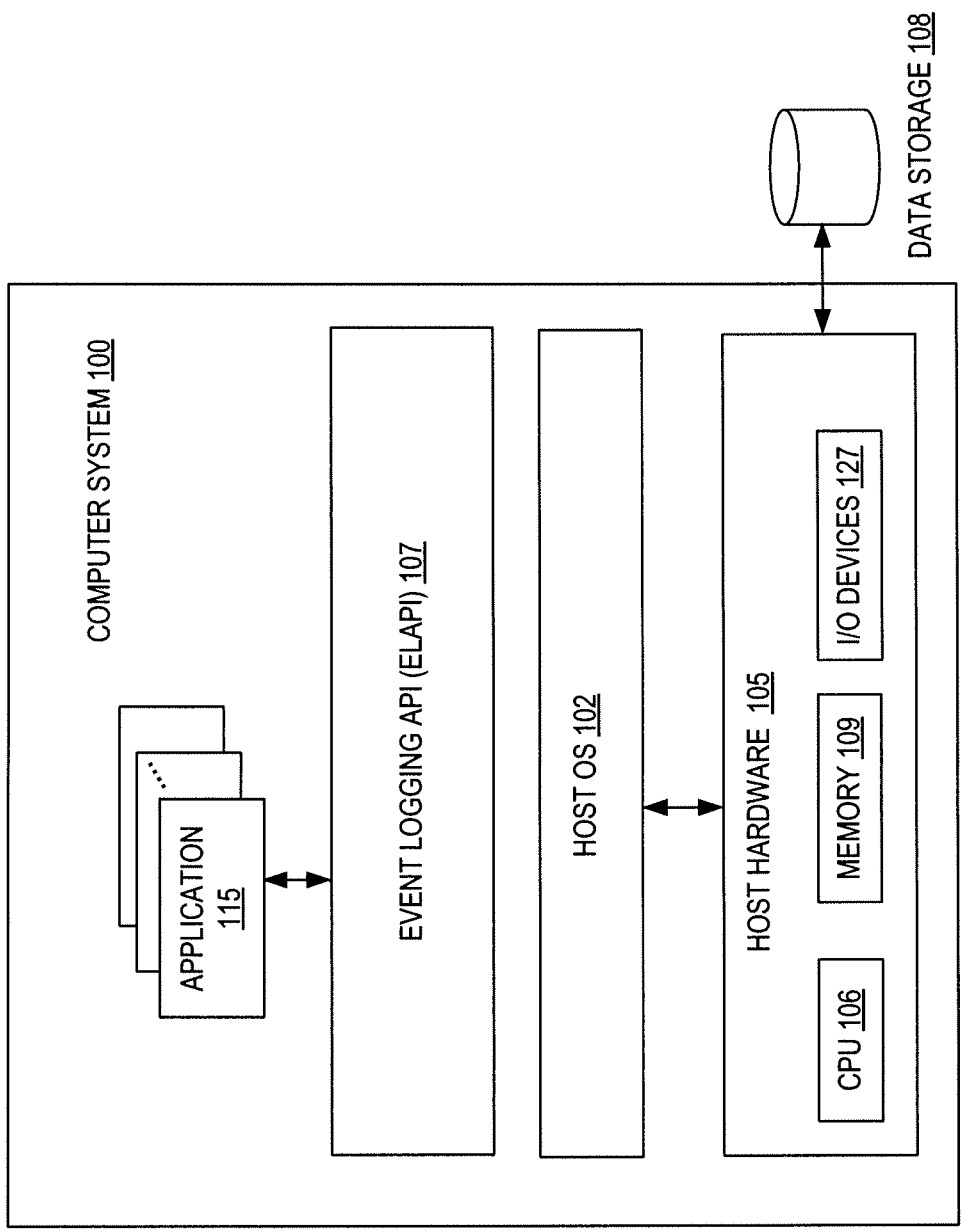
FIG. 1 is a block diagram of a computer system in which embodiments of the invention may be implemented.

Described herein is a method and system for event logging. In one embodiment, an event logging interface on a computer system receives data pertaining to an event from an application that is hosted by the computer system. Using the event logging interface, the computer system determines a target of the event, and determines one or more physical destinations referenced by the logical target. The data is then dispatched to one of the physical destinations.

In one embodiment, the event logging interface is implemented as an application programming interface (API), also referred to as an event logging API (ELAPI). The ELAPI is an interface to an application for receiving original structured event data from the application. The ELAPI abstracts an application from its actual logging destination. The actual logging destination can be a local file, syslog, database or a remote server location. The actual logging destination can be plugged into the ELAPI without any changes to the application. The ELAPI provides a configurable interface for sending event data into different destinations.

In one embodiment, the ELAPI accepts event data in the form of key-value pairs. The ELAPI allows an application to pass arbitrarily complex data to a logging destination. The data emitted from the application is a collection of key-value pairs (also referred to as "original structured event data"). The collection of key-value pairs is structured when the application creates it. The collection of key-value pairs is also "original" since it is the data emitted from the application, and the structured representation is not achieved by the ELAPI performing additional data parsing operations. The collections can be easily constructed, modified or nested, allowing reuse of the data in different events. For example, the information about a peer host or socket properties can often be reused in different events. The introduction of the key-value pairs resolves a problem in the existing logging interfaces, which is the lack of structure in the messages sent from the applications. The lack of structure makes analysis of the log data stream extremely difficult to reliably interpret.

The information logged by the ELAPI is complete and also human readable. In one embodiment, the ELAPI separates the data of the event from the actual presentation (i.e., formatting) of the message. Thus, the information logged by the ELAPI can contain much more data than the message presented to a user. The logging destinations that define human readable formats (e.g., a file) will receive the event data in the formatted, user readable form. Some logging destinations may receive the data and the formatting information separately. In those cases, the original structured event data can be easily converted into a human readable form at any moment when the user wants to inspect the event.

To improve the reliability of the logging destination, in one embodiment, the ELAPI allows defining multiple sinks (i.e., physical destinations) per logical target ("target") of an event. The sinks can be linked in a failover order. If a first sink in the failover order returns an error, the ELAPI will automatically fail over to a next sink without returning an error.

In one embodiment, the ELAPI can also be used as a reporting tool. Event data can be sent to an output destination (e.g., a file) in different formats (e.g., Comma-Separated Values (CSV), Hypertext Markup Language (HTML), Extensible Markup Language (XML), etc.) to generate a report. Thus, the ELAPI can be used to create simple conversion tools that receive data in one format and output the data in another format.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates an exemplary computer system 100 in which embodiments of the present invention may operate. The computer system 100 may be a server, workstation, personal computer (PC), mobile phone, hand-held computing device, personal digital assistant (PDA), etc. The computer system 100 may be coupled to a network (not shown), such as a public network (e.g., the Internet) or a private network (e.g., an Ethernet or a local area Network (LAN)).

The computer system 100 may include a host OS 102 (e.g., Linux OS, Windows® OS, etc.) to manage system resources, including access to host hardware 105. Host hardware 105 includes a central processing unit (CPU) 106, memory 109 and other hardware components (e.g., I/O devices 127). The host hardware 105 is also coupled to data storage 108. The memory 109 may include volatile memory devices (e.g., random access memory (RAM)), non-volatile memory devices (e.g., flash memory), and/or other types of memory devices. The data storage 108 may include mass storage devices, such as magnetic or optical storage based disks, tapes or hard drives.

According to one embodiment of the present invention, the computer system 100 may host a number of applications 115 to perform various tasks. During execution, an application 115 may encounter events that need to be recorded for logging, debugging, auditing or other purposes. For example, the application 115 may experience data loss at runtime, and may log information pertaining to the data loss for debugging purposes. The application 115 can send original structured event data, as a collection of key and value pairs, to an event logging module or logic, such as an event logging application programming interface (ELAPI) 107. The ELAPI 107 is an interface that allows applications to generate and send logging, tracing, audit, or other information to configurable destinations without knowing what its actual (i.e., physical) destinations of event data are. The physical destinations (e.g., syslogs, files or remote server locations) can be plugged into the ELAPI 107 and can be updated or configured as necessary, without any changes to the application. The event data can further be converted into a human readable format when requested by a user. The same event data can be presented, in more than one format, to application developers or other users as necessitated by the situations. As a result, the use of the ELAPI 107 significantly reduces the complexity of writing and developing an application.

In contrast, in a computer system without the ELAPI 107, an application developer would need to specify a logging destination (e.g., the syslog) within the application, and include application code that would format the original structured event data in accordance with the requirement of the destination. Information can be lost during data formatting and conversion. Further, tying an application with its physical destination would render it difficult to upgrade the destination at a later stage of application development. For example, as the development of an application matures, an application developer may want to change the logging destination from the syslog to a database. Changing the code in an application can be time consuming and error prone.

The implementation of the ELAPI 107 allows data reuse. An application developer may create an event template that includes a set of key-value pairs. The key-values pairs in the event template include common properties that do not change or rarely change during the execution of an application, or during the processing of a connection or a request. Instead of constructing the entire data set from an event each time, common data such as process ID, host name and IP address, severity and other attributes/properties can be combined together into the event template. Thus, in one scenario where an actual event needs to be logged, an application developer needs to add only a couple specific attributes that are related to this particular event, and references the pre-created template that contains the common data. In an alternative scenario, the event data may be passed from an application to the ELAPI 107 as a collection key-value pairs without the use of an event template.

An example of using an event template is provided as follows. An application developer may determine that all of the "error" events in an application have process ID, user ID, host name, time stamp, etc. The application developer may create a template that contains these fields (i.e., "attributes" or "properties"). When an error event occurs, the developer can create an event using this template, plus additional error code to it. The developer does not need to specify any of the fields that he has already prepared in the template.

Some of the fields in a template can be auto-resolvable. For example, the time stamp value in the template can be initially set to 0, and can be automatically replaced by the actual time stamp when an event is generated.

Assume that an event consists of the properties of A, B, C, D, E, and F, and only E and F are specific to the event. A, B, C and D are common properties that do not change for the application as a whole, or in the context in which the events are created. The term "context" refers to a "thread," "connection," "session," or other properties that may be less long-lived than the application itself, but long-lived enough so that multiple events will be originated with the same set of properties. Examples of common properties of the context may include: thread ID or connection peer name, socket number, session ID, etc. Thus, an application developer may create a template T that captures the common properties A, B, C and D, and then log the template T with E and F.

Figure 2:
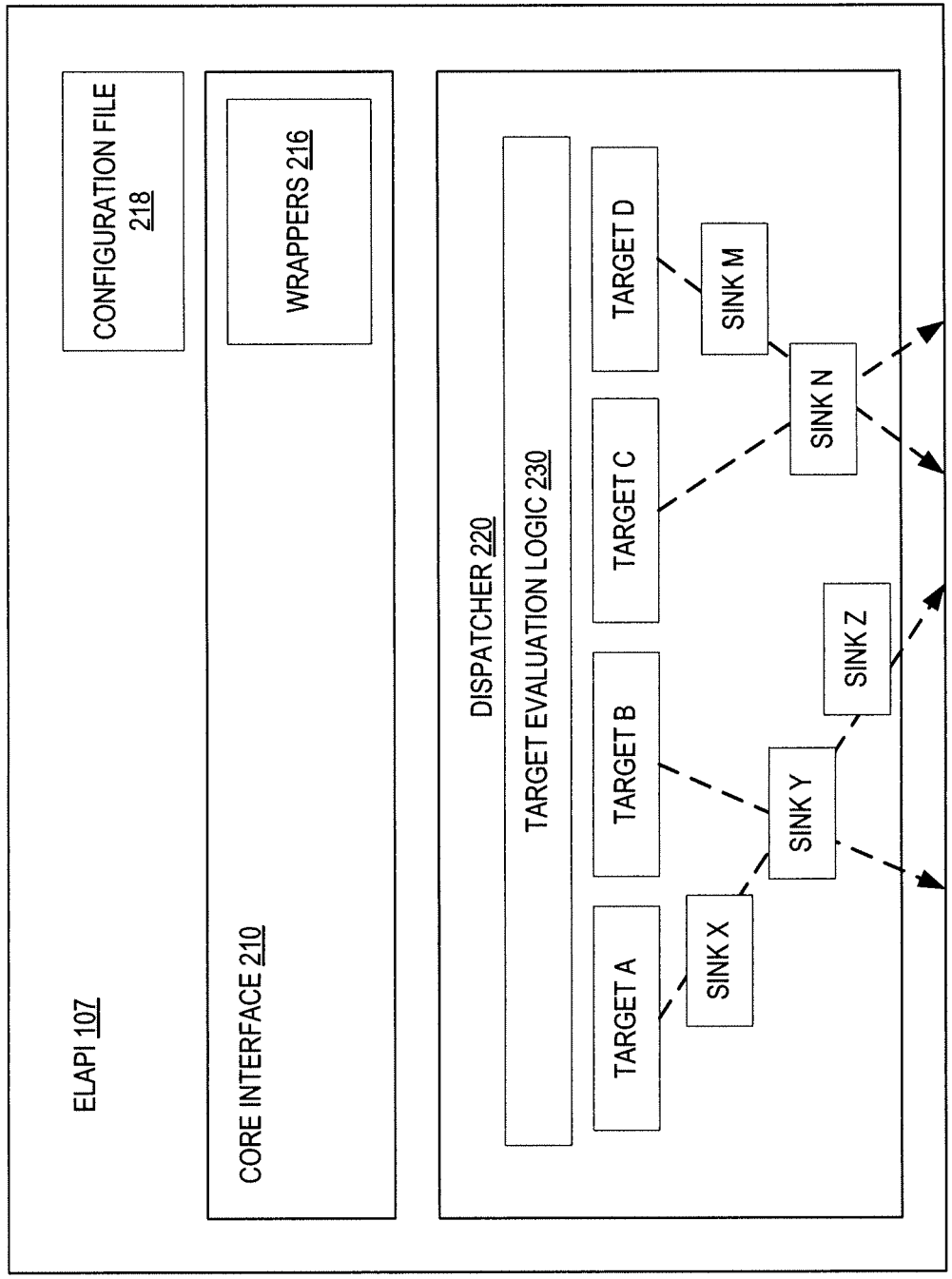
FIG. 2 is a block diagram of one embodiment of an event logging interface in a computer system.

FIG. 2 is a block diagram of one embodiment of the ELAPI 107. The ELAPI 107 provides several levels of interfaces for event logging. A core interface 210 implements a set of low level functions that allow creation and manipulation of events and event templates, as well as submission of these events for processing. With these low level functions, a caller needs to create an event and then submit it. This approach is flexible in some cases, but can incur an overhead in some other cases. For these other cases, the ELAPI 107 also includes a simplified interface consisting of a set of functions that provide event creation and submission functionality in one step. The ELAPI 107 may additionally provide a very primitive interface for the cases when the ELAPI 107 is invoked from a simple short-lived single threaded application.

The ELAPI 107 further includes a dispatcher 220, which is an entity for holding targets (e.g., targets A-D) and sending event data to the targets. The dispatcher 220 contains target evaluation logic 230 for determining whether an event is to be logged into a target and which target is to be used. In one embodiment, a target can be linked to one or more sinks (e.g., sinks X, Y, Z, M and N), which are also referred to as "physical destinations" of event data. Each sink is associated with a specific logging facility, such as a file, syslog, database, remote logging server etc. If a target is linked to multiple sinks, the multiple sinks can be chained in a failover order indicated by the dotted lines in FIG. 2.

In one embodiment, when the ELAPI 107 logs into a specific target (e.g., target A), the ELAPI 107 uses the first sink in the failover chain (e.g., sink X) linked to target A. If this sink returns an error and there is a next sink (e.g., sink Y) in the failover chain, the dispatcher 220 will automatically direct the event data from the target to the next sink without returning an error. If there are no available sinks in the chain (e.g., all of the sinks in the failover chain return an error), the ELAPI 107 will report the error to the application from which the event data was sent. The application has the responsibility to take a corresponding action to handle the error. In some embodiments, the same sink can be linked to different targets.

In one embodiment, the ELAPI 107 also includes a configuration file 218 that contains information about the targets and sinks. The information is used at runtime to determine the logical and physical destinations of event data. The configuration file 218 can be updated to indicate changes, additions and deletions to targets and sinks without a change to the application. In one embodiment, the configuration file 218 may be stored in a storage location (e.g., the memory 109 or the data storage 108) that is accessible by the ELAPI 107.

With the use of the ELAPI 107, the targets and sinks can be reconfigured as necessary without a change to the application. An application developer can write code that identifies the logical destinations ("targets") for the events generated by his application. For each event, the application developer identifies whether the event is a debug message, a normal operational log message, a special audit log message (e.g., a critical identity-related change), etc. What is behind these "logical" targets does not matter for the application developer when developing the application. An administrator, who uses the application, can configure the sink chains that link to each of the targets and provide an actual meaning to these destinations. The administrator will be able to configure whatever he sees fit as physical destinations.

For example, an application developer may identify 3 different targets: LOG, AUDIT and DEBUG. Assume that the application developer decides to use ID 0001 (in binary representation) for LOG, 0010 for AUDIT and 0100 for DEBUG. If the application developer wants to send event data into two targets for the same event at the same time (e.g., LOG and AUDIT), a logical OR operation: 0001 OR 0010=0011 can be performed. The argument 0011 will be passed to the ELAPI 107. The ELAPI 107, in turn, uses the argument, the list of targets and their associated sink chains from the configuration file 218 to determine where to route the event data. Each target is identified in the configuration file 218 by its target identifier. If the AND operation of this target identifier and the argument value result in a non-zero value, the event target is identified and the event data will be routed to the corresponding sink chain. Thus, with the argument 0011, the target 0001 and 0010 can be identified as the logical destinations of the event. If a target with an identifier of 0011 is also configured in the configuration file 218, the target 0011 will also be identified as a logical destination of the event.

The implementation of targets provides great flexibility to the development and use of an application. An application typically sends different information into different logs, but sometimes it may be necessary to send the same event into different logs. The ELAPI 107 provides targets as a convenient feature that enables an application developer to specify more than one target within one logging operation. The ELAPI 107 also enables an administrator to change the ELAPI configuration in such a way that two events (which were supposed to go into two different destinations) can be sent into one sink. The administrator may want (for a short time) to send all of the event data into one file to see the whole picture in one place. This feature can be important for the administrator to troubleshoot some issue.

Further, with the use of the ELAPI 107, an application developer can plug in code that formats and writes the original structured event data to the syslog, files and remote server locations. For example a service can be written that collects event data from multiple ELAPI-enabled applications, filters the data, and then delivers the data to a central auditing server for storage and processing. The client for this service can be implemented as an ELAPI sink, and plugged into ELAPI-enabled applications central collection of the events without modifying the applications.

Figure 3:
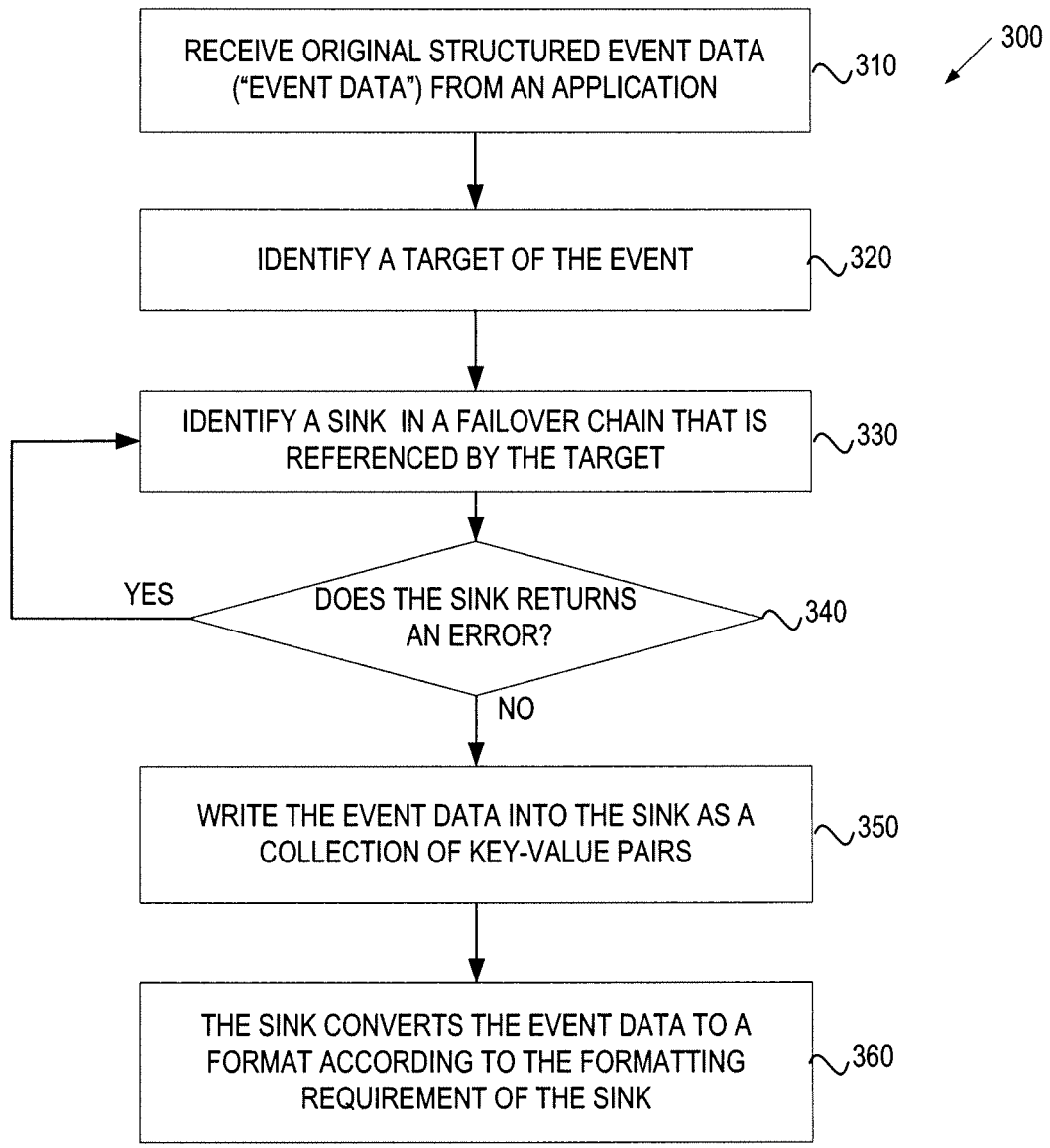
FIG. 3 is a flow diagram of one embodiment of a method of event logging.

FIG. 3 is a flow diagram illustrating one embodiment of a method 300 for event logging. The method 300 may be performed by computer system 400 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the ELAPI 107 of FIGS. 1 and 2.

Referring to FIG. 3, in one embodiment, the method 300 begins when the ELAPI 107 receives original structured event data ("event data") from an application (block 310). The application, when encounters an event, may call the ELAPI 107 and send the event data to the ELAPI 107. The event data may be passed to the ELAPI 107 as a collection of key-value pairs. The keys, also referred to as attributes, may include a time stamp, process ID (PID), hostname, etc. Keys may be defined and added by an application developer.

Upon receiving the event data, the ELAPI 107 identifies the target or targets of the event (block 320). In one embodiment, each target maintained by the ELAPI 107 has a corresponding section in the configuration file 218. This section specifies the sinks that are linked to the target and includes a bit mask value associated with and identifying the target. When a caller (e.g., an application) calls the ELAPI 107 at runtime, the call may include a bit mask argument. The bit mask argument can be used to identify the target of the event. In one embodiment, the ELAPI 107 compares the bit mask argument with all of the bit mask values stored in the configuration file 218. The comparison can be performed with a logical AND operation as described above. The result of the logical AND operation identifies one or more specific targets. An error will be returned if the result does not identify any target. Once a target is identified, the ELAPI 107 identifies the sinks that are linked to the target in a failover order (block 330). The ELAPI 107 will try to write into a sink that does not return an error. If a sink (e.g., the first sink) in the failover chain returns an error (block 340), the ELAPI 107 will try the next sink (e.g., the second sink, the third sink, etc.) in the chain, until it finds a sink that does not return an error. If all of the sinks in the failover chain return an error, the ELAPI 107 will report the error to the application from which the event data was sent.

The ELAPI 107 writes the event data to the identified sink as a collection of key-value pairs (block 350). The sink can format (e.g., serialize) the event data and writes into a file, syslog or some other physical destination (block 360). The sink can convert the event data into human readable form, insert the event data into a database, or send the event data to a central location for storage, etc. The sink may convert the event data into different formats for different purposes. For example, the data may be formatted into a message for the syslog, or a HTML format for viewing by a user via a Web browser.

The ELAPI 107 provides an application the options of synchronous process and asynchronous processing. Asynchronous processing allows an application to perform other tasks without waiting idly for the event data to be written into a device (e.g., a memory or a disk). Sometimes the communication with another service or writing to a file (e.g., when writing to a file on the Network File System (NFS)) can cause an application to block for a significant period of time. To avoid blocking, the ELAPI 107 supports integration with a "main loop" of an application. The "main loop" is a function that waits for a trigger; e.g., a socket to become ready to read or write, a signal to arrive, or a timer to expire. The ELAPI 107 and its sink hook into the main loop to add its timers, sockets and/or file descriptors, and to tell the main loop what is to be executed when specific triggers occur.

In one embodiment, the application and the ELAPI 107 exchange callbacks. The application passes to the ELAPI 107 one set of callbacks ("application callbacks") that the ELAPI 107 should use to talk to the main loop of the application. In return, the ELAPI 107 exposes another set of callbacks ("ELAPI callbacks") that the main loop should execute when the device is ready. It is the responsibility of the application developer to provide the implementation of the first set of callbacks (i.e., the application callbacks). These application callbacks will invoke the ELAPI callbacks to perform the actual writing to the device. When the ELAPI 107 wants to write data on a socket or file descriptor, it will execute the application callbacks to inform the main loop of the pending action. This pending action is queued by an event library that the application chooses to use for its main loop, and control will return to the application while the pending write is still enqueued. Thus, the application will not be blocked by the pending write, and can continue with its other tasks.

As soon as a trigger occurs (e.g., when the device is ready), the main loop of the application calls a corresponding ELAPI callback to perform an actual write operation to the device. If the actual write operation failed, the ELAPI callback can decide what to do next.

Figure 4:
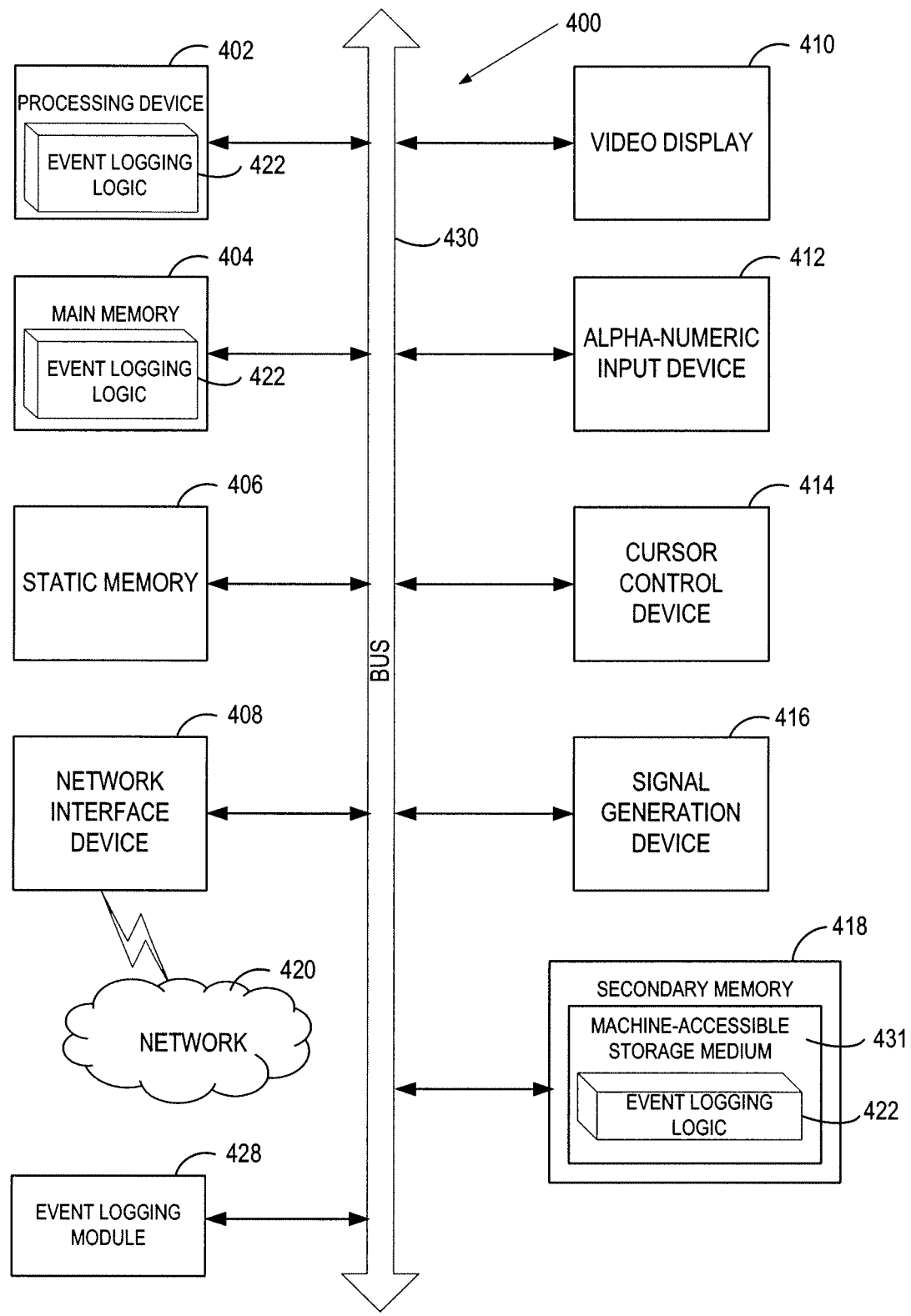
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the event logging logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., event logging logic 422) embodying any one or more of the methodologies or functions described herein (e.g., the ELAPI 107 of FIGS. 1 and 2). The event logging logic 422 may also reside, completely or at least partially, within the main memory 404 and/or within the processing device 402 during execution thereof by the computer system 400; the main memory 404 and the processing device 402 also constituting machine-readable storage media. The event logging logic 422 may further be transmitted or received over a network 420 via the network interface device 408.

The machine-readable storage medium 431 may also be used to store the event logging logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 400 may additionally include an event logging module 428 for implementing the functionalities of the ELAPI 107 of FIGS. 1 and 2. The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "dispatching", "converting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising
   receiving, by an event logging interface executed by a processing device, data pertaining to an event from an application hosted by the processing device, the event logging interface configurable to send the data to a plurality of physical destinations;
   determining, by the processing device, a physical destination in the plurality of physical destinations referenced by a logical target of the event using configuration information of the event logging interface, wherein the determining comprises determining a chain of the physical destinations in the plurality of physical destinations in a failover order; and
   upon receipt of an error from the physical destination in the chain, dispatching, by the processing device, the data to a next physical destination in the chain that does not return the error.

2. The method of claim 1, wherein the each physical destination is a plug-in component that can be added and changed without a change to the application.

3. The method of claim 1, wherein the configuration information is configurable to include multiple logical targets of the event.

4. The method of claim 1, wherein the data sent from the application comprises a collection of key-value pairs.

5. The method of claim 1, further comprising:
   receiving an event template from the application during occurrences of multiple different events, the event template comprises common properties that do not change or rarely change during execution of the application, or during processing of a connection or a request.

6. The method of claim 5, further comprising providing a reference to the event template along with the dispatched data.

7. The method of claim 1 further comprising:
   receiving an argument in a call made by the application, the argument being a result of a bitwise OR operation on identifiers that identify logical targets of the event; and
   performing a bitwise AND operation on the argument and target identifiers stored in the configuration information to determine the logical targets of the event.

8. The method of claim 1, further comprising:
   queuing a data write operation for writing the data into one of the physical destinations; and
   allowing the application an option of performing other tasks while the data write operation is enqueued.

9. A non-transitory computer readable storage medium including instructions that, when executed by a processing device, cause the processing device to perform operations comprising:
   receiving, by an event logging interface executed by a processing device, data pertaining to an event from an application hosted by the processing device, the event logging interface configurable to send the data to a plurality of physical destinations;
   determining, by the processing device, a physical destination in the plurality of physical destinations referenced by a logical target of the event using configuration information of the event logging interface, wherein the determining comprises determining a chain of the physical destinations in the plurality of physical destinations in a failover order; and upon receipt of an error from the physical destination in the chain, dispatching, by the processing device, the data to a next physical destination in the chain that does not return the error.

10. The non-transitory computer readable storage medium of claim 9, wherein the each physical destination is a plug-in component that can be added and changed without a change to the application.

11. The non-transitory computer readable storage medium of claim 9, wherein the configuration information is configurable to include multiple logical targets of the event.

12. The non-transitory computer readable storage medium of claim 9, wherein the data sent from the application comprises a collection of key-value pairs.

13. The non-transitory computer readable storage medium of claim 9, wherein the operations further comprise:

receiving an event template from the application during occurrences of multiple different events, the event template comprises common properties that do not change or rarely change during execution of the application, or during processing of a connection or a request.

14. The non-transitory computer readable storage medium of claim 13, wherein the operations further comprise providing a reference to the event template along with the dispatched data.

15. The non-transitory computer readable storage medium of claim 9, wherein the operations further comprise:

receiving an argument in a call made by the application, the argument being a result of a bitwise OR operation on identifiers that identify logical targets of the event; and performing a bitwise AND operation on the argument and target identifiers stored in the configuration information to determine the logical targets of the event.

16. The non-transitory computer readable storage medium of claim 9, wherein the operations further comprise:

queuing a data write operation for writing the data into the one of the physical destinations; and allowing the application an option of performing other tasks while the data write operation is enqueued.

17. A system comprising:

a processing device;

a memory coupled to the processing device, the processing device to:

receive, by an event logging interface executed by the processing device, the data pertaining to an event from an application hosted by the processing device, the event logging interface configurable to send the data to a plurality of physical destinations;

determine a physical destination in a plurality of physical destinations referenced by a logical target of the event using configuration information of the event logging interface, wherein the determine comprises determine a chain of the physical destinations in the plurality of physical destinations in a failover order; and upon receipt of an error from the physical destination in the chain, dispatch the data to a next physical destination in the chain that does not return the error.

18. The system of claim 17, wherein the physical destination is a plug-in component that can be added and changed without a change to the application.

19. The system of claim 17, wherein the data comprises a collection of key-value pairs.

20. The system of claim 17, the processing device to:

receive an event template from the application during occurrences of multiple different events, the event template comprises common properties that do not change or rarely change during execution of the application, or during processing of a connection or a request; and provide a reference to the event template along with the dispatched data.

* * * * *